United States Patent [19]

Sato

[11] Patent Number: 5,094,655

[45] Date of Patent: Mar. 10, 1992

[54] TRANSAXLE FOR REAR WHEEL DRIVE VEHICLE

[75] Inventor: Hitoshi Sato, Kanagawa, Japan

[73] Assignee: Nissan Motor Co., Ltd., Yokohama, Japan

[21] Appl. No.: 684,559

[22] Filed: Apr. 12, 1991

[30] Foreign Application Priority Data

Jun. 18, 1990 [JP] Japan .................. 2-157462

[51] Int. Cl.⁵ .......................... F16H 37/08
[52] U.S. Cl. .................. 475/198; 475/246; 384/246
[58] Field of Search .............. 475/198, 209, 246; 384/247, 249, 252, 263

[56] References Cited

U.S. PATENT DOCUMENTS

| | | | |
|---|---|---|---|
| 1,537,880 | 5/1925 | Reid | 384/249 |
| 2,027,013 | 1/1936 | Barnes | 475/198 |
| 2,546,969 | 6/1951 | Buckendale | 475/246 |
| 2,548,258 | 4/1951 | Griffith | 475/246 X |
| 2,971,398 | 2/1961 | Sieving | 475/198 X |
| 3,115,047 | 12/1963 | Lunn et al. | 475/198 X |
| 3,202,466 | 8/1965 | Kaptar | 475/246 X |
| 3,318,173 | 5/1967 | Puidokas | 475/246 X |
| 3,645,153 | 2/1972 | Northcraft | 475/198 X |
| 4,141,424 | 2/1979 | Murayama et al. | 475/198 X |
| 4,530,144 | 7/1985 | Hagelthorn | 384/247 |

FOREIGN PATENT DOCUMENTS

| | | | |
|---|---|---|---|
| 569261 | 11/1932 | | 475/249 |
| 648343 | 12/1928 | France | 475/198 |

OTHER PUBLICATIONS

Workshop Manual 928 Porsche, 1977, Repair Group 37, p. 928.

Primary Examiner—Dwight Diehl
Attorney, Agent, or Firm—Foley & Lardner

[57] ABSTRACT

A rear wheel drive automotive vehicle is provided with a transaxle including a transmsision and a differential. The output shaft of the transmission extends rearward of a ring gear of the differential. A hypoid pinion gear is fixedly mounted on the rear end section of the output shaft and meshed with the ring gear. The pinion gear is rotatably supported on the inner surface of the rear section of a differential casing through a roller bearing. The roller bearing is detachable and adjustable in location relative to the differential casing rear section so that the pinion gear is readily removable to facilitate an adjustment operation of tooth contact between the pinion gear and the ring gear of the differential.

8 Claims, 5 Drawing Sheets

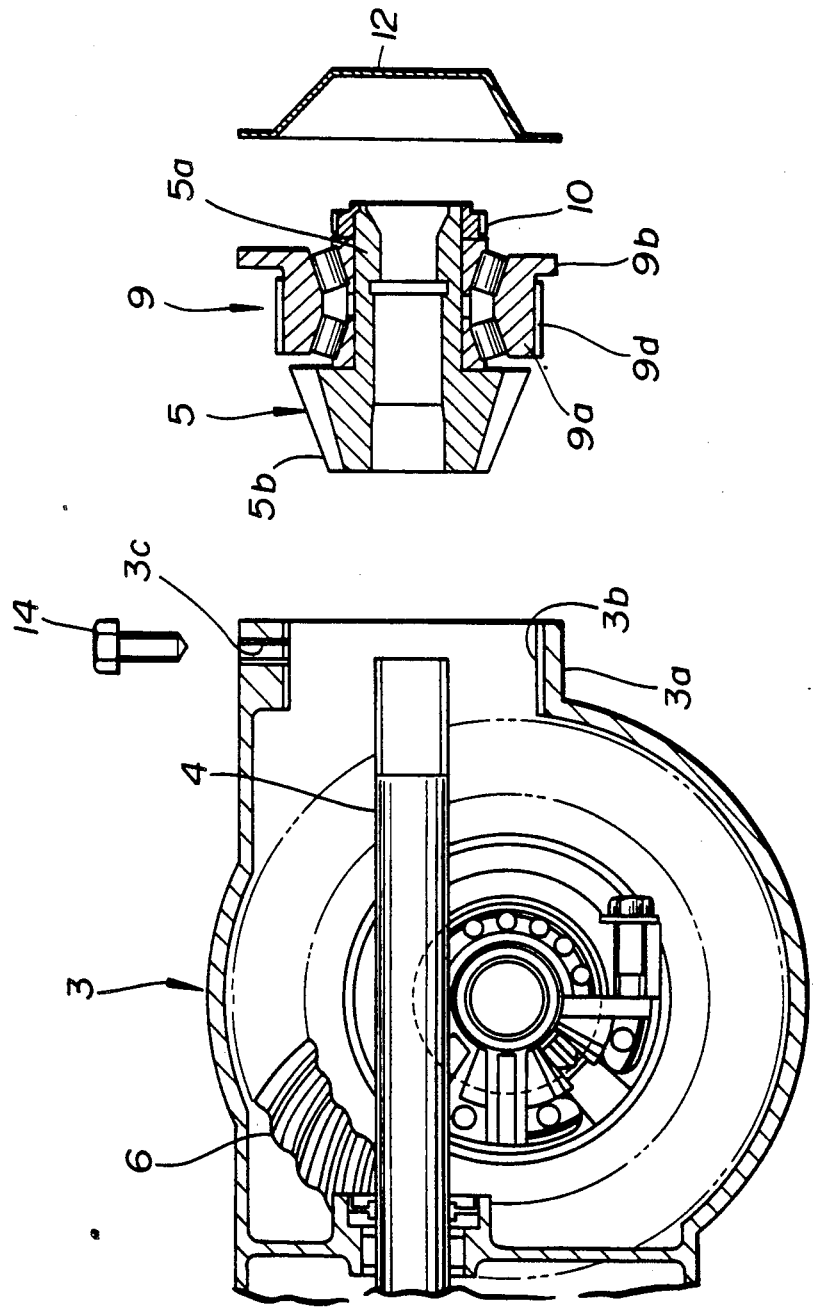

5,094,655

TRANSAXLE FOR REAR WHEEL DRIVE VEHICLE

BACKGROUND OF THE INVENTION

1. Field of the Invention

This invention relates to improvements in a transaxle for a rear wheel drive vehicle in which a transmission is combined with a differential through which rear wheels are driven, and more particularly to improvements in the transaxle to facitate a tooth contact adjustment in a differential and to contribute to widening the space of a passenger compartment.

2. Description of the Prior Art

Recently, a variety of transaxles for a rear wheel drive vehicle have been proposed and put into practical use in order to make vehicle weight distribution appropriate. An example of such a transaxle is shown in FIG. 1 which schematically illustrates the transaxle of Porsche 928. In FIG. 1, the transaxle includes a transmission 2' connected to a torque converter 1' which is drivably connected to an engine (not shown). The transmission 2' is combined with a differential 3' and has an output shaft 4' on which a pinion gear 5' is fixedly mounted. The pinion gear 5' is meshed with a ring gear 6' to which rear wheel axle shafts are connected, the axle shafts extending respectively rightward and leftward of the vehicle.

However, the following difficulties have been encountered in such a conventional transaxle: Since the pinion gear 5' is disposed at the front part of the differential 3', it is difficult to adjust the tooth contact between the pinion gear 5' and the ring gear 6'. Additionally, the distance between the front end of the transmission 2' and the center of the ring gear 6' is unavoidably long, thereby minimizing the residencial space for rear seats in a vehicle passenger compartment.

SUMMARY OF THE INVENTION

It is an object of the present invention to provide an improved transaxle for a rear wheel drive vehicle by which drawbacks encountered in conventional transaxles can be effectively overcome.

Another object of the present invention is to provide an improved transaxle for a rear wheel drive vehicle by which adjustment operation of tooth contact between a pinion gear and a ring gear of a differential is facilitated while effectively contributing to enlarging the space of a vehicle passenger compartment.

The transaxle of the present invention is for a rear wheel drive vehicle and is comprised of a differential having a casing in which a ring gear is rotatably disposed. The casing has first and second (front and rear) sections which are respectively on first and second (front and rear) sides which are opposite to each other with respect to an imaginary vertical plane containing the center of the ring gear. The transaxle is further comprised of a transmission having a casing connected with the first section of the differential casing. The transmission has an output shaft which extends in a direction of the differential casing second section over the vertical plane to form an end section located on the second side. A pinion gear forming part of the differential is fixedly mounted on the output shaft end section and meshed with the ring gear. The pinion gear is located on the second side. Additionally, a bearing forming part of the differential is provided so that the output shaft end section is rotatably supported therethrough on the differential casing second section. The bearing is detachably secured to the differential casing second section and adjustable in location relative to the differential casing second section.

Thus, according to the transaxle of the present invention, the pinion gear can be readily removable and therefore the adjustment operation of tooth contact between the pinion gear and the ring gear of the differential is facilitated. Additionally, since the pinion gear is located on the opposite side of the main body of the transmission with respect to the center of the ring gear, the distance between the front end of the transmission and the center of the ring gear is shortened thereby reducing the interference of the transaxle with a vehicle passenger compartment, thus enlarging the residencial space of the vehicle passenger compartment.

BRIEF DESCRIPTION OF THE DRAWINGS

In the drawings, the same reference numerals designate the same parts and elements throughout all the figures, in which:

FIG. 4 is an exploded view of the transaxle of

FIG. 6 is an exploded view of the transaxle of FIG. 5.

DETAILED DESCRIPTION OF THE INVENTION

Figure 2:
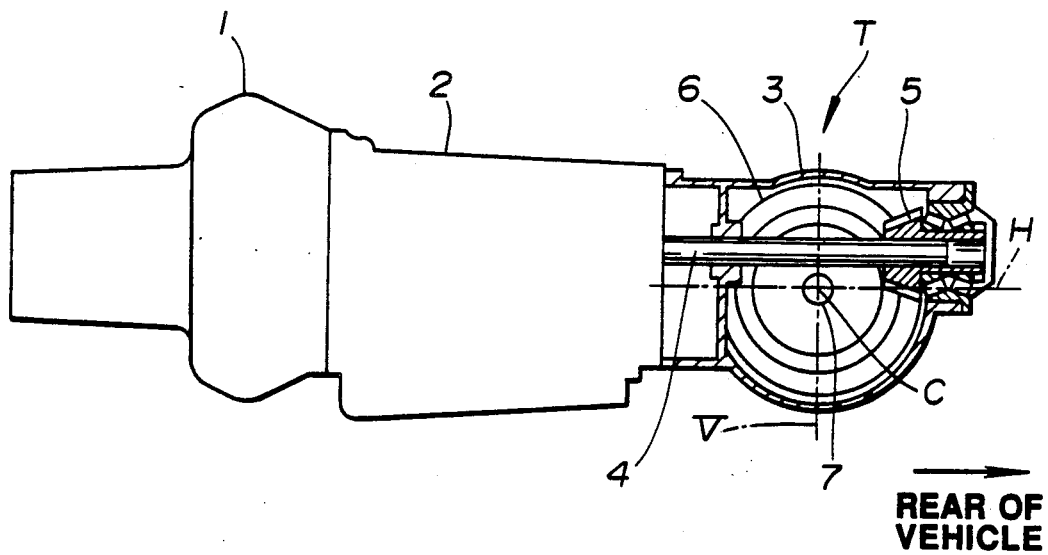
FIG. 2 is a schematic side view, partly in section, of a power train including an embodiment of a transaxle in accordance with the present invention.
Figure 3:
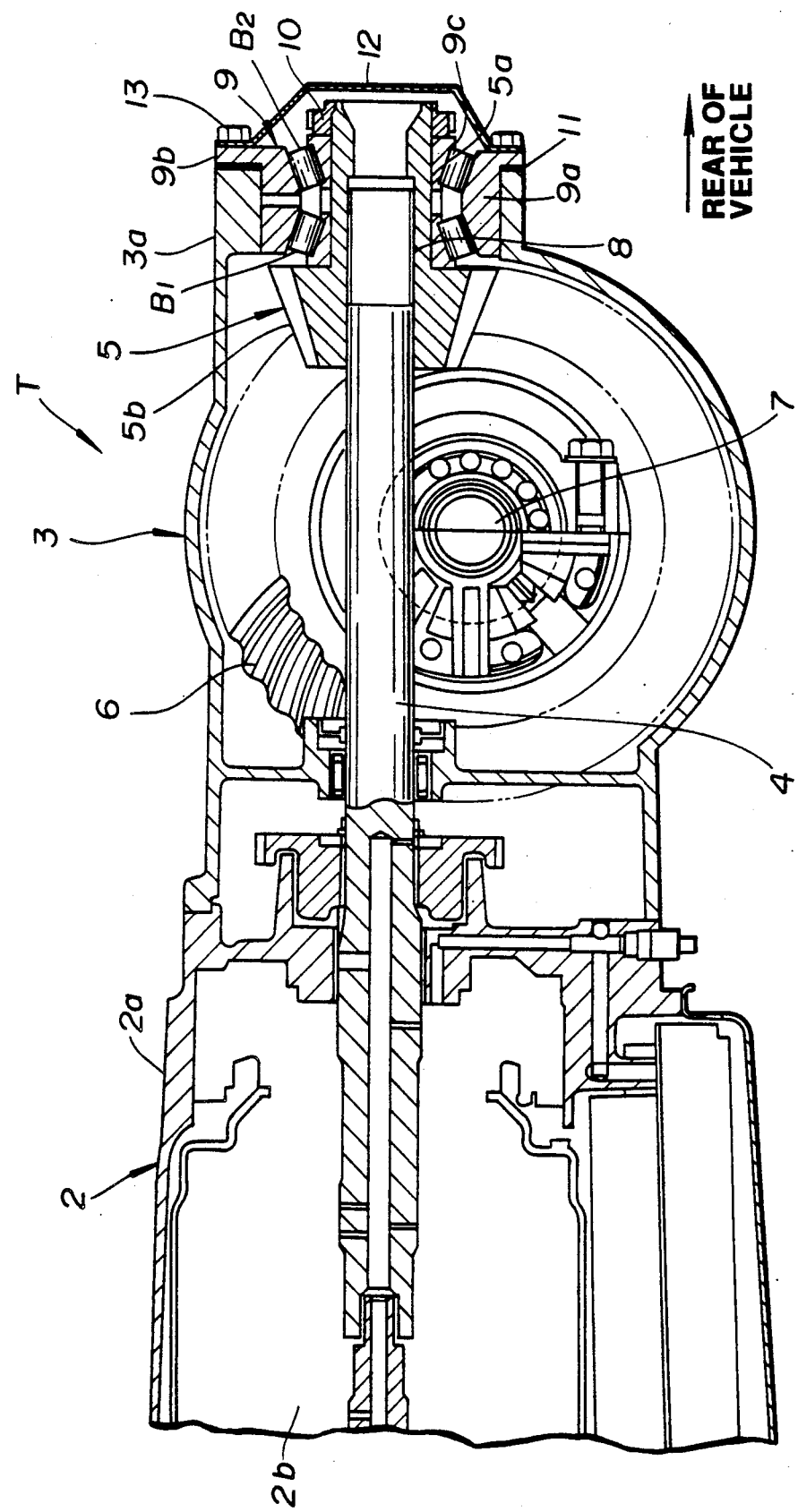
FIG. 3 is a fragmentary longitudinal sectional view of the transaxle of FIG. 2.
Figure 4:
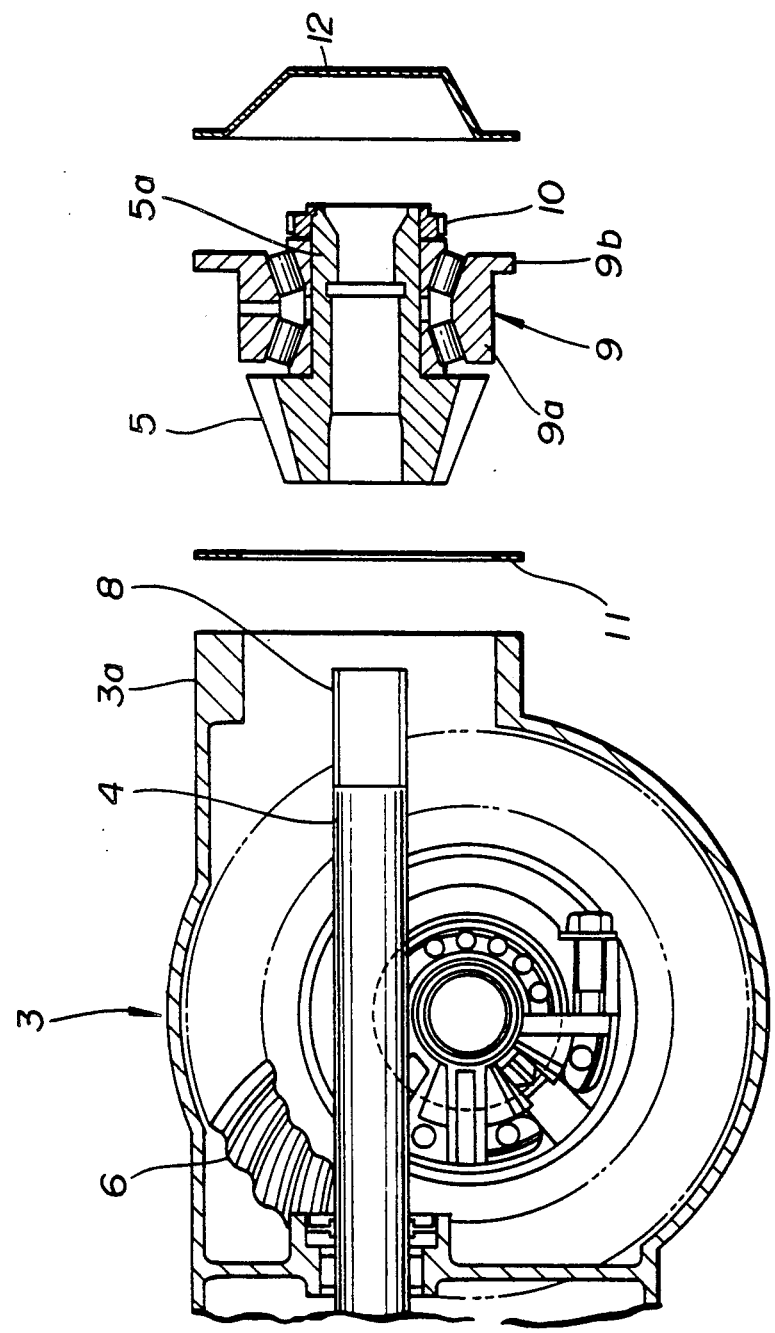

Referring now to FIGS. 2 to 4, there is shown an embodiment of a transaxle T for a rear wheel drive automotive vehicle, in accordance with the present invention. The transaxle T comprises a transmission 2 which incorporates a torque converter 1. The torque converter 1 is drivably connected with an internal combustion engine (not shown) which is forward mounted in the vehicle. Thus, the vehicle in this embodiment is of the front engine rear drive type.

A rear axle differential 3 is combined with the transmission 2 in one unit to constitute the transaxle T. Accordingly, the casing 3a of the differential 3 is securely connected at its front end section with the casing 2a of the transmission 2. The differential 3 is located immediately behind of the transmission 2 in the vehicle. The transmission 2 has an output shaft 4 on which a hypoid pinion gear 5 of the differential 3 is fixedly mounted. The hypoid pinion gear 5 is meshed with a ring gear 6 rotatably supported in the casing 3a of the differential 3. The reference numeral 7 denotes right and left side rear wheel axle shafts 7 which are drivably connected to the ring gear 6 and extend respectively rightward and leftward of the vehicle.

Figure 1:
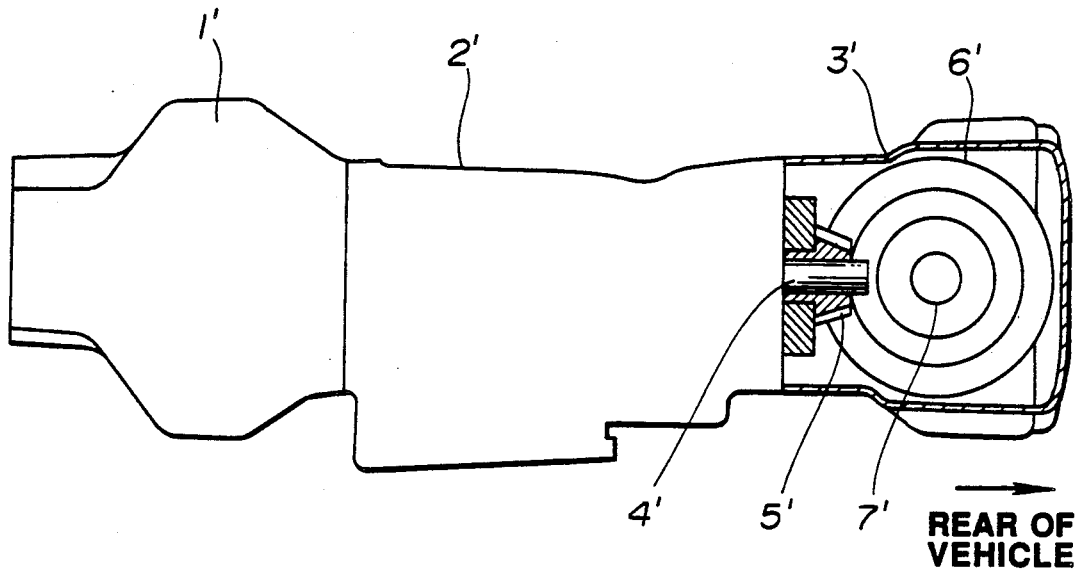
FIG. 1 is a schematic side view, partly in section, of a power train including a conventional transaxle.

In this embodiment, the output shaft 4 of the transmission 2 projects from the main body (or gear mechanism) 2b of the transmission 2 and extends rearward over the ring gear 6 of the differential 3 to reach the rear end section of the differential 3. The rear end section of the output shaft 4 is formed with a spline 8 through which the hypoid pinion gear 5 is fixedly fitted on the output shaft 4. Accordingly, the hypoid pinion gear 5 is located rearward of the center C of the ring gear 6. In other words, the hypoid pinion gear 5 and the main body 2b of the transmission 2 are located on the opposite sides of an imaginary vertical plane V (shown in FIG. 2) containing the center C of the ring gear 6. By virtue of using the hypoid pinion gear 5, the output shaft 4 of the transmission 2 is offset upward from the center C of the ring gear 6. Accordingly, the hypoid pinion gear 5 is located above an imaginary horizontal plane H (in FIG. 1) containing the center C of the ring gear 6.

The hypoid pinion gear 5 has a cylindrical shaft section 5a which is coaxial and integral with a gear section 5b which is meshed with the ring gear 6. The cylindrical shaft section 5a is rotatably supported through a bearing 9 by the rear section of the differential casing 3a. In this embodiment, the bearing 9 is of a so-called double tapered roller bearing type wherein first and second circularly arranged tapered roller bearings $B_1$, $B_2$ are disposed opposite to and generally symmetrical with each other. The first and second roller bearings $B_1$, $B_2$ are combined with each other to constitute a single unit and therefore have common outer and inner race members 9a, 9c.

The outer race member 9a is integrally formed at its rear end with a flange section 9b which radially outwardly extends. The flange section 9b is in tight contact with the rear end face (not identified) of the differential casing 3a with bolts 13. A tooth contact adjustment shim 11 is interposed between the rear end face of the differential casing 3a and the outer race member flange section 9b. As shown, the outer peripheral surface of the outer race member 9a is in tight contact with the inner peripheral surface of the rear end section of the differential casing 3a. The generally cylindrical inner race member 9c of the bearing 9 is fixedly mounted on the cylindrical shaft section 5a of the hypoid pinion gear 5. A stop nut 10 is threadedly mounted on the rear end section of the pinion gear cylindrical shaft section 5a, so that the inner race member 9c is securely interposed between the pinion gear section 5b and the stop nut 10. A cover 12 is secured to the rear face of the flange section 9b with the bolts 13 to cover the rear outer part of the bearing 9.

With the thus arranged transaxle, the hypoid pinion gear 5 can be easily extracted together with the bearing 9 out of the differential 3 by removing the bolts 13. Then the thickness of the tooth contact adjustment shim 11 is increased or decreased, thereby accomplishing adjustment of the tooth contact between the hypoid pinion gear 5 and the ring gear 6. Accordingly, the tooth contact adjustment can be largely facilitated.

Additionally, by virtue of the fact that the hypoid pinion gear 5 is located to the rear of the center C of the ring gear 6 of the differential 3, the distance between the front end of the transmission 2 and the center C of the ring gear 5 is shortened, thereby to reduce the interference of the transaxle with the vehicle passenger compartment, thus enlarging the residential space of the passenger compartment particularly the space for rear seats in the passenger compartment.

Figure 5:
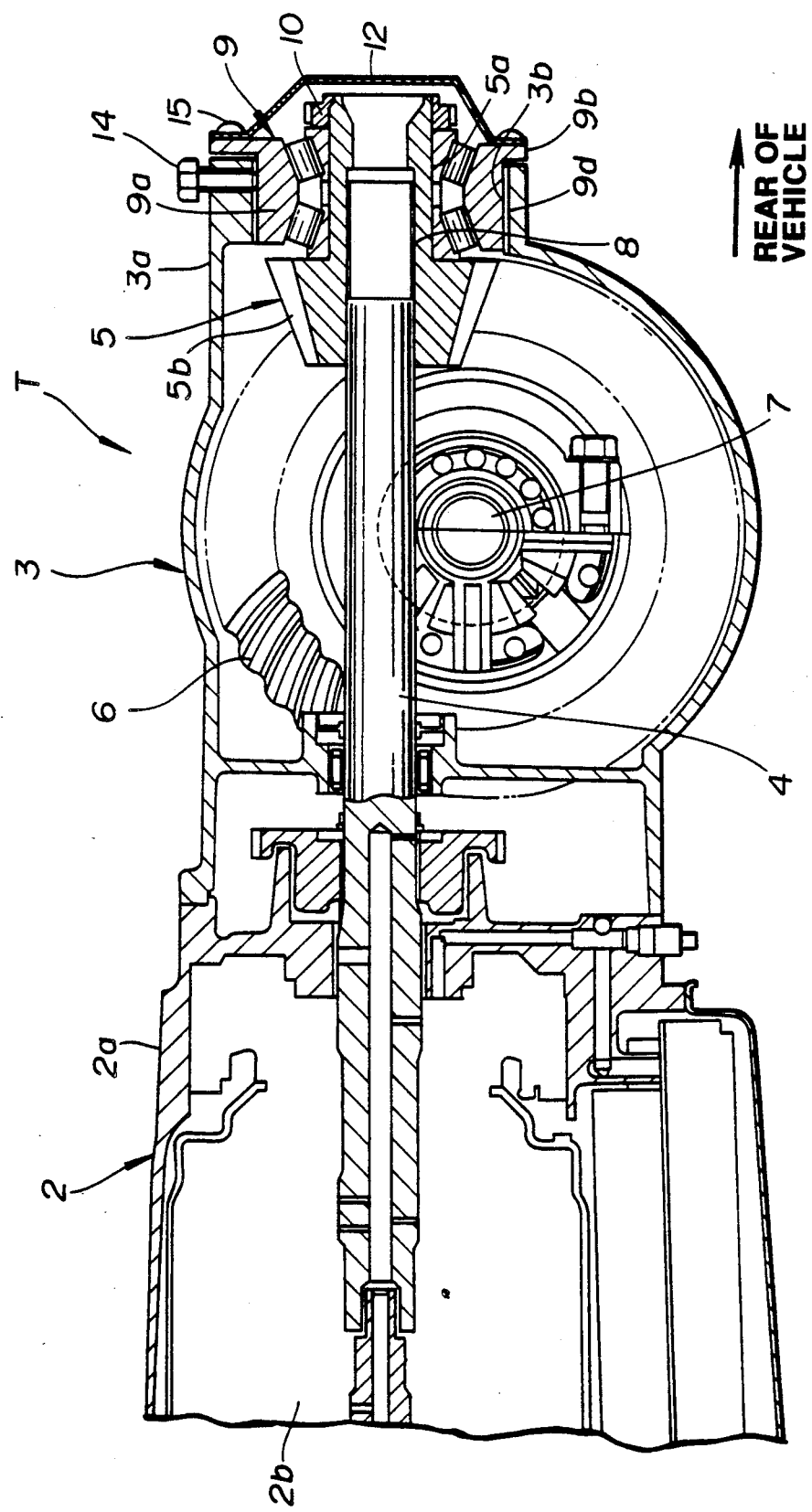
FIG. 5 is a fragmentary longitudinal sectional view similar to FIG. 3 but showing another embodiment of the transaxle in accordance with the present invention.

FIGS. 5 and 6 illustrate another embodiment of the transaxle in accordance with the present invention, which is similar to the embodiment of FIGS. 2 to 4. In this embodiment, the outer race member 9a of the bearing 9 is formed at its outer peripheral surface with an external thread 9d which is engageable with an internal thread 3b formed at the inner surface of the rear end section of the differential casing 3a. Accordingly, the axial installation position of the bearing 9 is adjustable by changing the threading-in amount of the bearing 9 relative to the differential casing rear end section. In this connection, the rear end section of the differential casing 3a is formed with a threaded hole 3c whose axis is perpendicular and opened to the internal thread 3b. A stop screw 14 is threadedly disposed in the threaded hole 3c and reaches the external thread 9d of the bearing outer race member 9a. In this embodiment, the cover 12 is secured to the flange section 9b of the outer race member 9a with small screws 15 in place of the bolts 13 in the embodiment of FIGS. 2 to 4.

With this arrangement, the hypoid pinion gear 5 can be easily extracted together with the bearing 9 from the differential 3 as shown in FIG. 6 by first loosening the stop screw 14 and then by rotating the bearing outer race member 9a so as to disengage the external thread 9b from the internal thread 3b. Additionally, adjustment of the tooth contact between the hypoid pinion gear 5 and the ring gear 6 can be readily accomplished by screwing the bearing outer race member 9a in and out of the rear end section of the differential casing 3a. When such a tooth contact adjustment has been completed, the stop screw 14 is screwed in the threaded hole 3c to fix the bearing outer race member 9a to the rear end section of the differential casing 3a.

While only the hypoid pinion gear 5 has been shown and described as being used as a gear meshed with the ring gear 6, it will be understood that other gears such as a spiral bevel gear may be used in place of the hypoid pinion gear 5.

I claim:

1. A transaxle for a rear wheel drive vehicle, comprising:

a differential having a casing and a ring gear rotatably disposed in said casing, said casing having first and second sections which are located respectively on first and second sides which are opposite to each other with respect to a vertical plane containing a center of said ring gear, said second section forming a free end section of said transaxle and having an opening formed at an extreme end of said free end section;

a transmission having a casing connected to said first section of said differential casing, said transmission having an output shaft which extends in a direction of said differential casing second section over said vertical plane to form a free end section located on said second side;

a pinion gear fixedly mounted on said output shaft free end section and meshed with said ring gear, said pinion gear being located on said second side and forming part of said differential, said pinion gear being readily removable from said output shaft free end section out of said transmission casing through said opening of said transmission casing second section; and a detachable and adjustable bearing unit through which said output shaft free end section is rotatably supported on said differential casing second section, a major part of said unit being disposed in said opening of said differential casing second section, said unit being in contact with said pinion gear and being secured to said differential casing second section, said unit being readily detachable from and adjustable in location relative to said differential casing second section to accomplish adjustment of tooth contact between said ring gear and said pinion gear, said unit including a bearing through which said output shaft free end section is rotatably supported on said differential casing second section, said bearing forming part of said differential.

2. A transaxle as claimed in claim 1, wherein said pinion gear includes a gear section meshed with said ring gear, and a cylindrical shaft section integral and coaxial with said gear section, said cylindrical shaft section being fixedly mounted on said output shaft end section, wherein said bearing is a roller bearing fitted between an outer peripheral surface of said pinion gear cylindrical shaft section and an inner surface of said differential casing rear section.

3. A transaxle for a rear wheel drive vehicle, comprising:
- a differential having a casing and a ring gear rotatably disposed in said casing, said casing having first and second sections which are located respectively on first and second sides which are opposite to each other with respect to a vertical plane containing a center of said ring gear;
- a transmission having a casing connected to said first section of said differential casing, said transmission having an output shaft which extends in a direction of said differential casing second section over said vertical plane to form an end section located on said second side;
- a pinion gear fixedly mounted on said output shaft end section and meshed with said ring gear, said pinion gear being located on said second side and forming part of said differential, said pinion gear including a gear section meshed with said ring gear, and a cylindrical shaft section integral and coaxial with said gear section, said cylindrical shaft section being fixedly mounted on said output shaft end section; and
- a bearing through which said output shaft end section is rotatably supported on said differential casing second section, said bearing forming part of said differential and being detachably secured to said differential casing second section and adjustable in location relative to said differential casing second section, said bearing including a roller bearing fitted between an outer peripheral surface of said pinion gear cylindrical shaft section and an inner surface of said differential casing rear section;
- wherein said roller bearing has a outer race member which is formed with a radially outwardly extending flange section, said flange section being in contact with a rear end face of said differential casing rear section.

4. A transaxle as claimed in claim 3, wherein said differential includes a tooth contact adjustment shim interposed between said flange section and said rear end face of said differential casing rear section.

5. A transaxle as claimed in claim 4, wherein said differential includes bolts for detachably fastening said outer race member flange section to said rear end face of said differential casing rear section.

6. A transaxle for a rear wheel drive vehicle, comprising:
- a differential having a casing and a ring gear rotatably disposed in said casing, said casing having first and second sections which are located respectively on first and second sides which are opposite to each other with respect to a vertical plane containing a center of said ring gear;
- a transmission having a casing connected to said first section of said differential casing, said transmission having an output shaft which extends in a direction of said differential casing second section over said vertical plane to form an end section located on said second side;
- a pinion gear fixedly mounted on said output shaft end section and meshed with said ring gear, said pinion gear being located on said second side and forming part of said differential, said pinion gear comprising a hypoid pinion gear which is located above a horizontal plane containing the center of said ring gear relative to the vehicle; and
- a bearing through which said output shaft end section is rotatably supported on said differential casing second section, said bearing forming part of said differential and being detachably secured to said differential casing second section and adjustable in location relative to said differential casing second section.

7. A transaxle for a rear wheel drive vehicle, comprising:
- a differential having a casing in which a ring gear is rotatably disposed, said casing having first and second sections which are located respectively on first and second sides which are opposite to each other with respect to a vertical plane containing a center of said ring gear;
- a transmission having a casing connected to said first section of said differential casing, said transmission having an output shaft which extends in a direction of said differential casing second section over said vertical plane to form an end section located on said second side;
- a pinion gear fixedly mounted on said output shaft end section and meshed with said ring gear, said pinion gear being located on said second side and forming part of said differential, said pinion gear including a gear section meshed with said ring gear, and a cylindrical shaft section integral and coaxial with said gear section, said cylindrical shaft section being fixedly mounted on said output shaft end section; and
- a bearing through which said output shaft end section is rotatably supported on said differential casing second section, said bearing forming part of said differential and being detachably secured to said differential casing second section and adjustable in location relative to said differential casing second section, said bearing including a roller bearing fitted between an outer peripheral surface of said pinion gear cylindrical shaft section and an inner surface of said differential casing rear section;
- wherein said roller bearing has an outer race member which is formed at its outer peripheral surface with an external thread which is engageable with an internal thread formed at the inner surface of said differential casing rear section.

8. A transaxle as claimed in claim 7, wherein said differential casing rear section is formed with a threaded hole which is perpendicular to and reaches said internal thread, wherein said differential includes a stop screw threadedly disposed in said threaded hole and reaching said bearing outer race member external thread.

* * * * *